United States Patent [19]
Gordon, II et al.

[11] Patent Number: 6,144,361
[45] Date of Patent: Nov. 7, 2000

[54] TRANSMISSIVE ELECTROPHORETIC DISPLAY WITH VERTICAL ELECTRODES

[75] Inventors: Joseph Grover Gordon, II; Mark Whitney Hart; Sally Ann Swanson, all of San Jose, Calif.

[73] Assignee: International Business Machines Corporation, Armonk, N.Y.

[21] Appl. No.: 09/154,364

[22] Filed: Sep. 16, 1998

[51] Int. Cl.[7] .............................. G09G 3/34; G02B 26/00
[52] U.S. Cl. ............................................ 345/107; 359/296
[58] Field of Search .............................. 345/107; 359/296

[56] References Cited

U.S. PATENT DOCUMENTS

| | | | |
|---|---|---|---|
| 3,612,758 | 10/1971 | Evans et al. | 178/5.4 R |
| 4,062,009 | 12/1977 | Raverdy et al. | 340/324 |
| 4,071,430 | 1/1978 | Liebert | 204/299 |
| 4,218,302 | 8/1980 | Dalisa et al. | 204/299 R |
| 4,272,596 | 6/1981 | Harbour et al. | 430/37 |
| 4,620,916 | 11/1986 | Zwemer et al. | 204/299 R |
| 4,648,956 | 3/1987 | Marshall et al. | 204/299 |
| 4,650,288 | 3/1987 | White | 350/362 |
| 4,833,464 | 5/1989 | Di Santo et al. | 340/793 |
| 5,293,528 | 3/1994 | Di Santo et al. | 345/107 |
| 5,298,833 | 3/1994 | Hou | 313/483 |
| 5,745,094 | 4/1998 | Gordon, II et al. | 345/107 |
| 5,872,552 | 2/1999 | Gordon, II et al. | 345/107 |

FOREIGN PATENT DOCUMENTS

| | | | |
|---|---|---|---|
| 2-223933 | 9/1960 | Japan | G02F 1/167 |
| 51-130241 | 11/1976 | Japan | G02F 1/17 |
| 55-071782 | 5/1980 | Japan | C09K 9/02 |
| 55-105227 | 8/1980 | Japan | G02F 1/19 |
| 59-165028 | 9/1984 | Japan | G02F 1/19 |
| 60-087317 | 5/1985 | Japan | G02F 1/19 |
| 60-189731 | 9/1985 | Japan | G02F 1/19 |
| 2-189525 | 7/1990 | Japan | G02F 1/167 |
| 2-223932 | 9/1990 | Japan | G02F 1/167 |
| 2-284123 | 11/1990 | Japan | G02F 1/167 |
| 2-284128 | 11/1990 | Japan | G02F 1/167 |
| 3-266818 | 11/1991 | Japan | G02F 1/167 |
| 3-284729 | 12/1991 | Japan | G02F 1/167 |
| 4-127190 | 4/1992 | Japan | G09F 9/37 |
| 4-166917 | 6/1992 | Japan | G02F 1/167 |
| 4-166918 | 6/1992 | Japan | G02F 1/167 |

OTHER PUBLICATIONS

Beilin et al. "2000–Character Electrophoretic Display", SID 86 Digest, pp. 136–140.
Chiang, "Conduction Mechanism of Charge Control Agents Used in Electrophoretic Display Devices", Proceeding of the S.I.D., vol. 18, 3rd/4th Quarters 1977, pp. 275–282.
Chiang, "Electrophoretic Displays: The State of the Art", IEEE, 1980, pp. 10–12.
Croucher et al., "Electrophoretic Display: Materials as Related to Performance", Photographic Science and Engineering, vol. 25, No. 2, Mar./Apr. 1981, pp. 80–86.

(List continued on next page.)

*Primary Examiner*—Richard A. Hjerpe
*Assistant Examiner*—Benjamin D. Bowers
*Attorney, Agent, or Firm*—Thomas R. Berthold

[57] ABSTRACT

A transmissive electrophoretic display is generally comprised of a regular lateral array of transmissive electrophoretic cells; each uniformly illuminated from the rear by a backlight. Each cell is comprised of a suspension of charged, black or colored light-absorbing pigment particles in a light-transmissive fluid. Each cell is also comprised of a light-transmissive front and rear window, at least one non-obstructing counter electrode, and at least one non-obstructing, vertically-disposed collecting electrode. With the application of appropriate voltages to the collecting and counter electrodes, each cell can be switched between a light and dark state. In the dark state, the light-absorbing pigment particles are distributed to cover the horizontal area of the cell, thus absorbing light from the backlight and preventing it from reaching the viewer. In the light state, the light-absorbing pigment particles are collected on vertical surfaces within the cell, thus allowing light from the backlight to pass through the cell and reach the viewer.

8 Claims, 3 Drawing Sheets

OTHER PUBLICATIONS

Croucher et al., "Some Physicochemical Properties of Electrophoretic Display Materials", Ind. Eng. Chem. Prod. Res. Dev., vol. 20, No. 2, 1981, pp. 324–329.

Dalisa, "Electrophoretic Display Technology", Proceeding of the S.I.D., vol. 18, 1st Quarter 1977, pp. 43–50.

Dalisa, "Electrophoretic Display Technology", IEEE Transactions on Electron Devices, vol. ED–24, No. 7, Jul. 1977, pp. 827–834.

Dalisa, "Electroporetic Displays", Top. Appl. Phys., vol. 40, 1990, pp. 213–232.

Fitzhenry, "Identification of a Charging Mechanism Using Infrared Spectroscopy", Applied Spectroscopy, vol. 33, No. 2, 1979, pp. 107–110.

Fitzhenry, "Optical Effects of Adsorption of Dyes on Pigment Used in Electrophoretic Image Display", Applied Optics, vol. 18, No. 19, Oct. 1, 1979, pp. 3332–3337.

Fitzhenry–Ritz, "Optical Properties of Electrophoretic Image Display", IEEE, 1980, pp. 13–25.

Fitzhenry–Ritz, "Optical Properties of Electrophoretic Image Displays", IEEE Transactions on Electron Devices, vol. ED–28, No. 6, Jun. 1981, pp. 726–735.

Hopper et al., "An Electrophoretic Display, Its Properties, Model, and Addressing", IEEE Transactions on Electron Devices, vol. ED–26, No. 8, Aug. 1979, pp. 1148–1152.

Liebert et al., "A 512 Character Electrophoretic Display", IEEE 1980, pp. 26–30.

Murau et al., "The Understading and Elimination of Some Suspension Instabilities in an Electrophoretic Display", Journal of Applied Physics, vol. 39, No. 9, Sep. 1978, pp. 4820–4829.

Murau, "Characteristics of an X–Y Addressed Electrophoretic Display (EPID)", SID 84 Digest, 1984, p. 141.

Novotny et al., "Optical and Electrical Characterization of Electrophoretic Displays", Journal of the Electrochemical Society, vol. 126, No. 12, Dec. 1979, pp. 2211–2216.

Shiffman et al., "An Electrophoretic Image Display with Internal NMOS Address Logic and Display Drivers", Proceedings of the SID, vol. 25, No. 2, 1984, pp. 105–115.

Singer et al., "An X–Y Addressable Electrophoretic Display", Proceeding of the S.I.D., vol. 18, 3rd/4th Quarters, 1977, pp. 255–266.

Swank et al., "The Development of a Self–contained Instant– display Erasable Electrophoretic X–ray Imager", Journal of Applied Physics, vol. 50, No. 10, Oct. 1979, pp. 6534–6542.

Vance, "Optical Characteristics of Electrophoretic Displays", Proceeding of the S.I.D., vol. 18, 3rd/4th Quarters, 1977, pp. 267–274.

Novotny, "Applications of Nonaqueous Colloids",Elsevier Science Publishers B.V., 1987, pp. 361–375.

Yamaguchi et al., "Equivalent Circuit of Ion Projection–driven Electrophoretic Display", IEICE Transactions, vol. E74, No. 12, Dec. 1991, pp. 4152–4156.

TRANSMISSIVE ELECTROPHORETIC DISPLAY WITH VERTICAL ELECTRODES

RELATED APPLICATIONS

This application is related to three concurrently filed co-pending applications, Ser. Nos. 09/154,114; 09/154,284; and 09/154,626.

TECHNICAL FIELD

The present invention relates to an electrophoretic display. In particular the invention relates to a light-transmissive electrophoretic display with vertical electrodes.

BACKGROUND OF THE INVENTION

An electrophoretic cell is a cell comprised of pigment particles suspended in a fluid and uses electrophoresis to switch between the following two states:

Distributed State: Particles are positioned to cover the horizontal area of the cell. This can be accomplished, for example, by dispersing the particles throughout the cell, by forcing the particles to form a layer on the horizontal surfaces of the cell, or by some combination of both.

Collected State: Particles are positioned to minimize their coverage of the horizontal area of the cell, thus allowing light to be transmitted through the cell. This can be accomplished, for example, by compacting the particles in a horizontal area that is much smaller than the horizontal area of the cell, by forcing the particles to form a layer on the vertical surfaces of the cell, or by some combination of both.

The electrophoretic cell can serve as a light valve since the distributed and collected states can be made to have different light absorbing and/or light scattering characteristics. As a result, an electrophoretic cell can be placed in the light path between a light source and a viewer and can be used to regulate the appearance of a pixel in a display.

Electrophoretic displays offer excellent viewing characteristics with extremely low power requirements. The intrinsic qualities of both reflective and transmissive electrophoretic displays are known to those skilled in the art and are responsible for continued interest in this technology. The object of the present invention is to provide an improved electrode configuration for a transmissive electrophoretic display.

A transmissive electrophoretic display is generally comprised of a regular lateral array of transmissive electrophoretic cells. Each cell is generally comprised of a suspension of charged pigment particles colloidally dispersed in a light-transmissive fluid that is contained between two parallel light-transmissive windows that are uniformly illuminated from the side opposite the viewer with a backlight. Each cell is also generally comprised of electrode elements disposed between the parallel windows that are arranged to transport and control the spatial distribution of the charged particles under the influence of an electric field. Each transmissive electrophoretic cell serves as a light valve since the light absorbing and/or light scattering characteristics of a cell depend on the spatial distribution of the particles within the cell.

Dalisa, et al., in U.S. Pat. No. 4,218,302, describe a transmissive electrophoretic display that uses particles to either allow or frustrate the total internal reflection of light at the interface between the interior of the rear window and the suspension fluid. In the regions of this interface where no particles are present, the conditions for total internal reflection are satisfied, and light from the source is reflected back towards the source and the viewer sees dark. In the regions of this interface where the particles are present, the conditions for total internal reflection are frustrated, and light from the source passes through the interface and the viewer sees light. The contrast offered by this approach therefore depends on the extent to which the particles can be forced to form an intimate, continuous layer at this interface.

In other disclosed embodiments of a transmissive electrophoretic display, visual contrast is achieved by either placing absorbing particles in, or removing absorbing particles from the light path between the backlight and the viewer. When a selected portion of the lateral area is fully covered by absorbing particles, light from the backlight is substantially absorbed and the viewer sees dark. When the lateral area occupied by the absorbing particles is reduced, light from the backlight can be transmitted and the viewer sees light. Consequently, the resulting performance of a transmissive electrophoretic display using this approach critically depends on the scheme used to alter the lateral area occupied by the absorbing particles.

Marshall et al., in U.S. Pat. No. 4,648,956, describes several embodiments of a transmissive electrophoretic display in which the lateral area occupied by the absorbing particles is controlled by using an array of horizontally disposed electrodes whose total area is small compared to the horizontal viewing area of the display. In these embodiments the suspension is contained between a transparent, large area upper electrode and a small area lower electrode. When the absorbing particles in a selected region of the display are collected on the small-area lower electrode, they only cover a small portion of the horizontal area of the selected region. As a result, most of the light from the source passes through the selected region without being absorbed and the viewer sees light. When the absorbing particles are drawn to the upper electrode, they substantially cover the horizontal area of the selected region so that most of the light from the source is absorbed before it can reach the viewer and the viewer sees dark.

Hou, in U.S. Pat. No. 5,298,833, describes a transmissive electrophoretic display in which the lateral area occupied by the absorbing particles is controlled by using a conductive mesh screen disposed between the backlight and the viewer. In this embodiment, the mesh screen covers the viewing area of the display and is immersed in a suspension comprised of black particles in a clear fluid. Particles are either drawn to, or removed from a selected area of the mesh by using patterned transparent electrodes disposed above and below the mesh. When the black particles are drawn to the mesh they sit on the mesh without completely covering its holes. Light from the source is transmitted through the holes and the viewer sees light. When the particles are removed from the mesh, they are drawn to cover the selected transparent electrode. Light from the source is substantially absorbed in the area covered by the electrode and the viewer sees dark.

In both of the last two cited references, the desired darkness of the dark state, along with optical density and packing fraction of the particles, fixes the required number of particles. In these embodiments, therefore, the brightness of the light state is limited by the horizontal area the required number of particles can be forced to occupy. This occupied area can be reduced by compacting the collected particles into a small volume, as was proposed in the previous embodiments, but this approach has serious associated difficulties.

To give the display a reproducible light and dark state, the particles must withstand repeated switching between a collected state and a dispersed state without significant agglomeration or sticking. A small collection volume necessitates a highly compacted collected state and therefore places extreme demands on the long-term stability of the particles. Using a small area collection electrode also increases the voltage required to place the amount of charge on this electrode that is necessary to collect many particles.

There is a continuing need in the art for a low-power transmissive electrophoretic display with high contrast and brightness. It is therefore an object of the present invention to provide transmissive electrophoretic display having improved contrast and brightness with reduced switching voltage and power requirements. Other objects and advantages will become apparent from the following disclosure.

SUMMARY OF THE INVENTION

The present invention relates to a transmissive electrophoretic display. The display is intended to be viewed while illuminated from the rear by a backlight. The display is comprised of many electrophoretic cells located in lateral adjacency in a plane. Each cell is comprised of a light-transmissive front and rear window, at least one non-obstructing counter electrode and at least one non-obstructing, vertically disposed collecting electrode. Each cell also contains a suspension of charged, light-absorbing pigment particles in a light-transmissive fluid.

The amount of light transmitted by each cell is controlled by the position of the pigment particles within the cell. The position, in turn, is directed by the application of appropriate voltages to the collecting and counter electrodes. When the pigment particles are positioned in the path of the light, the light entering the rear window from the backlight is significantly attenuated before emerging from the front window, and the viewer sees dark. When the pigment particles are substantially removed from the path of the light, light entering the rear window can pass through the front window to the viewer without significant attenuation, and the viewer sees light.

Unlike previously proposed embodiments of a transmissive electrophoretic display, this invention utilizes vertically disposed electrodes to control the position of the light-absorbing pigment particles and in the extreme, force them between two states, a distributed state and a collected state. In the distributed state, the light-absorbing particles are positioned to cover the horizontal area of the cell and are thus positioned to maximize the attenuation of transmitted light. This can be accomplished, for example, by dispersing the particles throughout the cell, by forcing the particles to form a layer on the horizontal surfaces of the cell, or by some combination of both. In the collected state, the light-absorbing particles are positioned to minimize their coverage of the horizontal area of the cell and are thus positioned to minimize their attenuation of transmitted light. In this invention this is accomplished by forcing the particles to form a layer on vertical surfaces of the cell.

Collecting the pigment particles on vertically disposed surfaces significantly reduces the horizontal area they occupy while keeping the available collection area large. This invention, therefore, increases the brightness of the light state of such a display while reducing its voltage and power requirements.

A more thorough disclosure of the present invention is presented in the detailed description that follows and from the accompanying drawings.

DESCRIPTION OF THE PREFERRED EMBODIMENTS

Figure 1A:
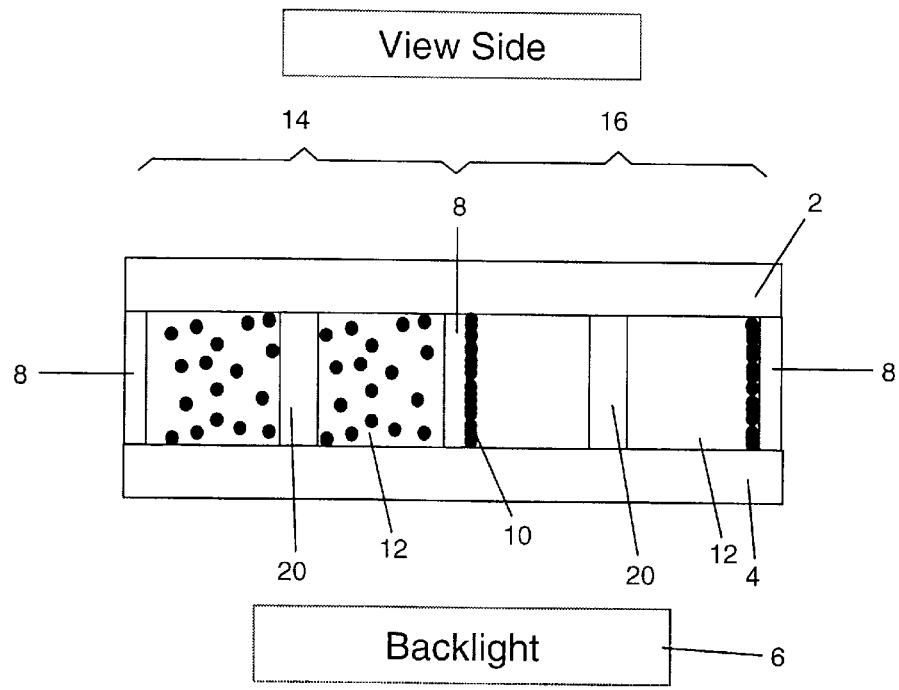
FIGS. 1a and 1b are sectional and top views, respectively, of an embodiment of electrophoretic display cells of the present invention.

The present invention relates to a transmissive electrophoretic display. The display is intended to be viewed while illuminated from the rear by a backlight. The display is comprised of many electrophoretic cells located in lateral adjacency in a plane. Each cell is comprised of a light-transmissive front and rear window, a non-obstructing counter electrode and a non-obstructing collecting electrode that is vertically disposed, i.e., oriented generally perpendicularly to the planar front and rear windows. Each cell also contains a suspension of charged, light-absorbing pigment particles in a light-transmissive fluid.

The amount of light transmitted by each cell is controlled by the position of the pigment particles within the cell. The position, in turn, is directed by the application of appropriate voltages to the collecting and counter electrodes. When the pigment particles are positioned in the path of the light, the light entering the rear window from the backlight is significantly attenuated before emerging from the front window, and the viewer sees dark. When the pigment particles are substantially removed from the path of the light, light entering the rear window can pass through the front window to the viewer without significant attenuation, and the viewer sees light.

This invention utilizes vertically disposed electrodes to control the position of the light-absorbing pigment particles and in the extreme, force them between two states, a distributed state and a collected state. In the distributed state, the light absorbing particles are positioned to cover the horizontal area of the cell and are thus positioned to maximize the attenuation of light. This can be accomplished, for example, by dispersing the particles throughout the cell, by forcing the particles to form a layer on the horizontal surfaces of the cell, or by some combination of both. In the collected state, the light-absorbing particles are collected on the collecting electrode and are thus positioned to minimize their coverage of the horizontal area of the cell to minimize their attenuation of light. In this invention this is accomplished by forcing the particles to form a layer on vertical surfaces of the cell, with the vertical surfaces acting as the collecting electrode.

The suspension is minimally composed of pigment particles and a light-transmissive fluid. The properties of the suspension are preferably highly stable with both time and use. The suspension is preferably highly resistant to agglomeration, flocculation, and sticking to the surfaces in the cell, even after being collected and re-dispersed many times. The suspension preferably doesn't react with the surfaces in the cell. The specific gravity of the pigment particles and the fluid are preferably similar. The pigment particles preferably acquire a single polarity when placed in suspension.

Optionally, other components may be added to the suspension such as charge control additives, dispersants, and surfactants to improve the performance of the suspension. Suitable additives include sodium dioctylsulfosuccinate, zirconium octoate, and metal soaps such as lecithan, barium petronate, calcium petronate, alkyl succinimide, iron naphthenate, and polyethylene glycol sorbitan stearate.

The suspension fluid must be light-transmissive. The fluid can be colorless or colored with either a dye and/or pigment. The fluid preferably has minimum solvent action on the pigments and does not react with the surfaces in the cell. The fluid is preferably dielectric and substantially free of ions. The fluid preferably has a low viscosity. The fluid can be a mixture of fluids. Suitable fluids include silicone fluids such as hexamethyidisiloxane, octamethyltrisiloxane, decamethyltetrasiloxane, and other poly(dimethylsiloxane) s. Suitable fluids also include hydrocarbons such as decane, dodecane, tetradecane, xylene, Sohio odorless solvent (a kerosene fraction available from Exxon Company), toluene, hexane and Isopar® C, E, G, H, K, L, M, and V and Norpar® 12, 13, and 15 (branched and linear saturated aliphatic hydrocarbons available from Exxon Company).

The pigment particles must be light-absorbing. The pigment particles can be black or colored such as red, green, blue, cyan, magenta, yellow, or the like.

Suitable classes of inorganic pigments include:
Cadmium Red
Cadmium sulfo-selenide (black)
Carbon Black
Chromium oxide (green)
Iron oxides (black)
Iron oxides (red)
Lead chromate (yellow)
Manganese dioxide (brown)
Silicon monoxide (reddish brown)
Sulfur (yellow)
Vermilion Red Suitable classes of organic pigments include:
Anthracene (fluorescent blue, fluorescent yellow)
Anthraquinone (blue, red, yellow)
Azonaphthols (magenta)
Azopyridone (yellow)
Heterocyclic Azo (cyan, magenta)
Methine (yellow)
Nigrosines (black)
Phthalocyanine (blue, green, cyan)
Quinacridone (magenta)

Suitable opaque pigment particles include:
Anric Brown (C.I. Pigment Brown 6)
Cabot Mogul L (black)
C.I. Direct Yellow 86
C.I. Direct Blue 199 (cyan)
C.I. Food Black 2
Dalama® Yellow (Pigment Yellow 74)
Hansa® Yellow (Pigment Yellow 98)
Indo® Brilliant Scarlet (Pigment Red 123)
Monastral® Green G (C.I. Pigment Green 7)
Monastral® Blue B (C.I. Pigment Blue 15)
Monastral® Blue G (C.I. Pigment Blue 15)
Monastra® Green B (C.I. Pigment Green 7)
Paliotol® Black L0080 (C.I. Pigment Black 1)
Permanent Rubine F6BI3-1731 (Pigment Red 184)
Pigment Scarlett (C.I. Pigment Red 60)
Quindo® Magenta (Pigment Red 122)
Stirling NS N 77Y (Pigment Black 7)
Toluidine Red B (C.I. Pigment Red 3)
Toluidine Red Y (C.I. Pigment Red 3)
Toluidine Yellow G (C.I. Pigment Yellow)
Watchung® Red B (C.I. Pigment Red 48)

Other suitable pigment particles will be known to those skilled in the art such as those disclosed in U.S. Pat. Nos. 5,200,289 and 4,631,244.

The counter electrode(s) and the vertically-disposed collecting electrode(s) in each cell are constituted or sized or positioned to be non-obstructing. This means that in the collected state, neither the particle coated collecting electrode nor the counter electrode unacceptably interferes with the passage of light as it travels through the cell, i.e. substantially all of the incident light is transmitted through the cell.

A non-obstructing, vertically-disposed collecting electrode can be realized by forming it into a feature whose vertical area significantly exceeds its horizontal area. Examples include a tall but narrow wall or a tall but thin pedestal. A non-obstructing counter electrode can be realized similarly or, alternatively, by coating the inside surface of the front window and/or rear window with a layer of conductive, light-transmissive material such as indium tin oxide.

There can be one or more non-obstructing, vertically-disposed collecting electrodes and one or more non-obstructing counter electrodes in each cell and either electrode can be common to more than one cell. The electrodes are preferably good conductors (e.g. aluminum, chromium, copper, nickel) and can be light-transmissive (e.g. indium tin oxide). While the collecting electrode(s) must be disposed substantially perpendicular to the front and rear windows, the counter electrode(s) can be disposed vertically and/or horizontally in the cell.

The following example is a detailed description of a display of the present invention. The details fall within the scope of, and serve to exemplify, the more general description set forth above. The example is presented for illustrative purposes only, and is not intended as a restriction on the scope of the invention.

Referring to FIGS. 1a and 1b through FIG. 5 there are illustrated preferred embodiments of electrophoretic display cells in accordance with the present invention. Each figure illustrates two identical laterally adjacent cells 14 and 16. Cell 14 is shown in its distributed state and cell 16 is shown in its collected state. Each cell 14 and 16 generally comprises a front light-transmissive window 2 and a rear light-transmissive window 4 illuminated by a backlight 6. Each cell has six generally planar walls, a front wall formed by the inner surface of front window 2, a rear wall formed by the inner surface of rear window 4, and four side walls that are generally perpendicularly to and extend between the front and rear walls. Each cell 14 and 16 has a non-obstructing, vertically-disposed collecting electrode 8 and counter electrode 20 disposed within the cell and spaced apart as illustrated. Each cell also has a suspension comprised of pigment particles 10 in a light-transmissive fluid 12 in the space between the front window 2 and the rear window 4.

Figure 1B:
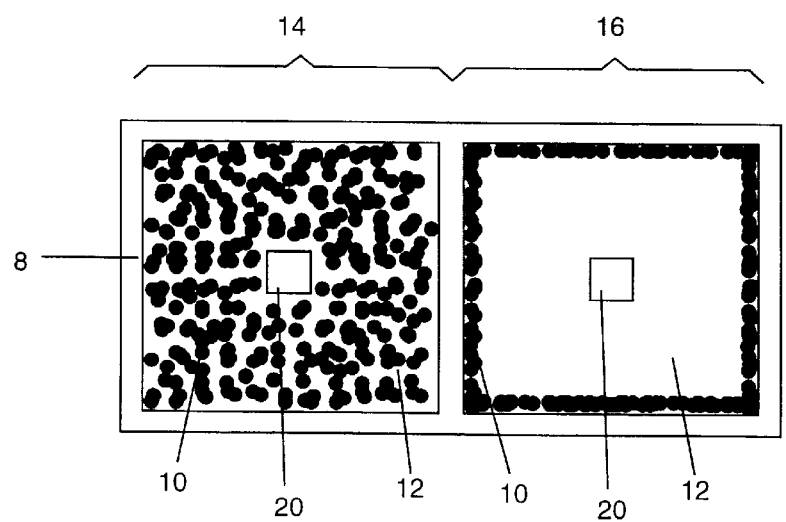

A sectional and top view of a preferred arrangement is illustrated in FIGS. 1a and 1b, respectively. In these figures the counter electrodes 20 represent individually addressable posts. The horizontal area occupied by a post is much smaller than the horizontal area of the cell and the height of a post is comparable to the spacing between the front window 2 and the rear window 4. The collecting electrode 8 is represented by a thin vertical wall oriented perpendicularly to the front and rear windows 2, 4, respectively. The four vertical side walls define the perimeter of each cell 14 and 16. Adjacent cells share a wall. The walls that surround each cell form a common structure that is held at the same voltage. The horizontal area occupied by the wall structure is much smaller than the horizontal area of the display and the height of the wall structure is comparable to the spacing between the front window 2 and the rear window 4.

With the appropriate voltage applied to the addressable electrode 20, a cell can be switched to its distributed state, as illustrated by cell 14. In this embodiment, the distributed state is one in which the particles 10 are uniformly dispersed throughout the volume of the cell 14. As a result, the light-absorbing particles 10 substantially cover the horizontal area of the cell 14 and are thus positioned to substantially absorb the light from the backlight 6 entering the cell 14 before it reaches the front window 2. Cell 14, therefore, appears dark to the viewer.

When the voltage applied to the addressable electrode 20 is appropriately changed, the cell is switched to its collected state, as illustrated by cell 16. In this embodiment, the collected state is one in which the particles 10 are collected on the interior vertical surfaces of the walls 8 that surround cell 16. Since they form a thin layer on a vertically disposed surface, they occupy substantially no horizontal area and are thus positioned to allow light from the backlight 6 entering the cell 16 to reach the front window 2 with substantially no attenuation, as shown by cell 16 in FIG. 1b. Cell 16, therefore, appears light to the viewer. In addition, since the collection area of the collection electrode 8 is large, i.e., the entire interior surface of the perimeter walls, the particles 10 can be removed from the path of light without forcing them into a small, highly compacted volume.

Figure 2:
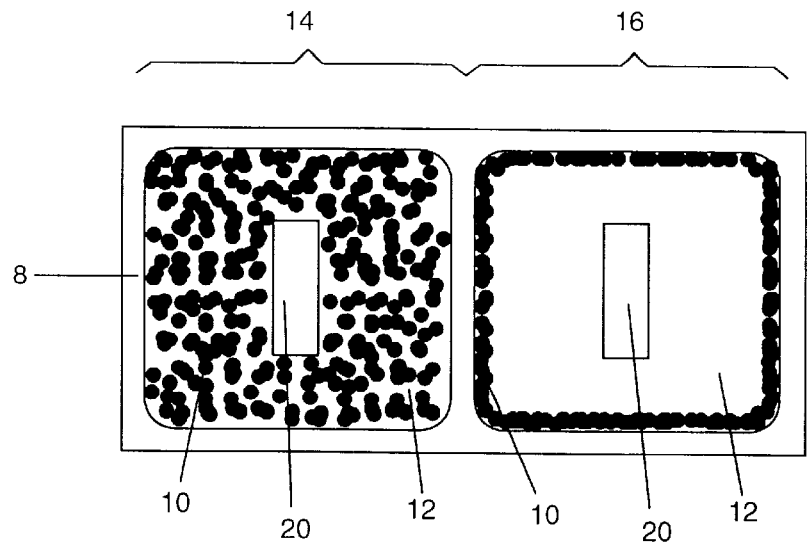
FIG. 2 is a top view of a second embodiment of electrophoretic display cells of the present invention.

Variations of this embodiment can be realized by giving the collecting and counter electrodes various shapes. A top view, i.e., a view as seen by the viewer of the display, of such a variation is illustrated in FIG. 2. Here the counter electrode 20 is rectangular in shape and the interior corners of the side walls of the collecting electrode 8 have been rounded. While this arrangement strengthens the electric field across parts of the cell, it also increases the horizontal area occupied by the counter electrode.

Figure 3:
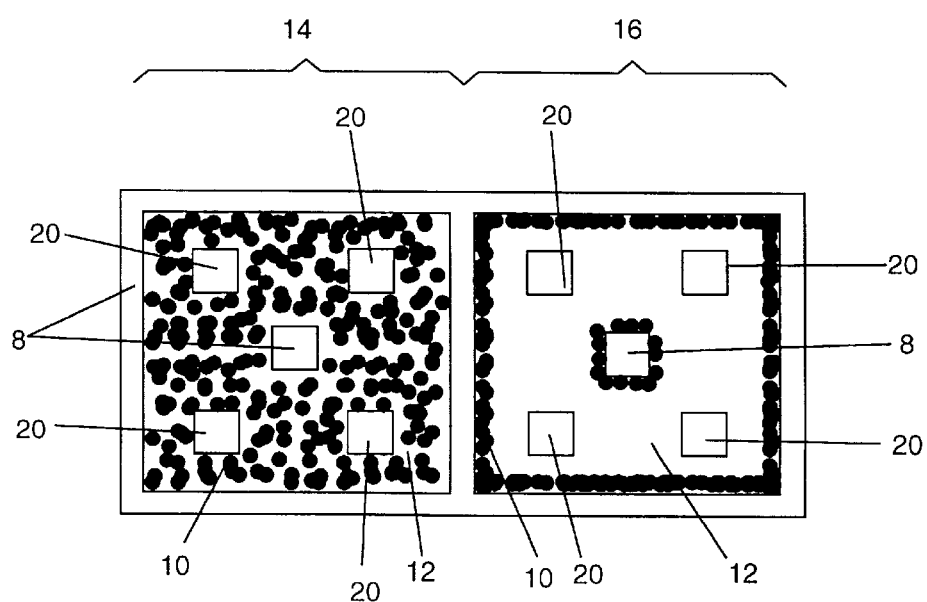
FIG. 3 is a top view of a third embodiment of electrophoretic display cells of the present invention.

A top view of another embodiment, this one with multiple collecting electrodes and counter electrodes, is illustrated in FIG. 3. In this arrangement the center post and perimeter walls are preferably held at the same voltage and comprise the collecting electrode 8. The counter electrode 20 is comprised of four addressable side posts located on diagonals of the cell between the center post and the inside corners and are preferably held at the same voltage. In the collected state, as illustrated by cell 16, the particles form a thin layer on both the inner vertical surface of the perimeter wall and the outer vertical surface of the center post.

Figure 4:
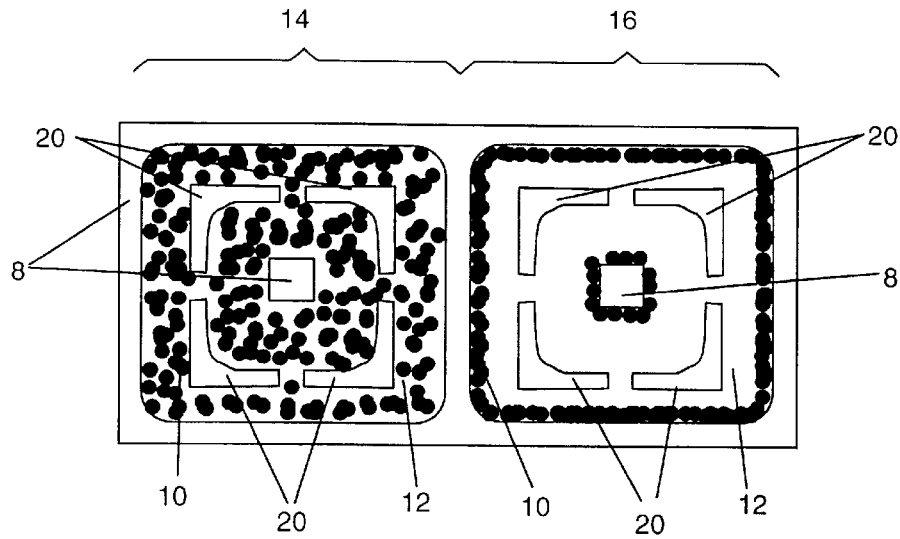
FIG. 4 is a top view of a fourth embodiment of electrophoretic display cells of the present invention.

FIG. 4 illustrates a top view of a variation of the previous embodiment. The center post and the perimeter wall still comprise the collecting electrode 8, but the inside corners of the perimeter walls have been rounded. The four addressable counter electrodes 20 in this variation are generally L-shaped with rounded inside corners. This arrangement makes the electric field more cylindrically-symmetric and thus reduces the variation of the electric field strength between the electrodes. Uniform electric field strength is desirable to uniformly disperse the particles in the distributed state.

Figure 5:
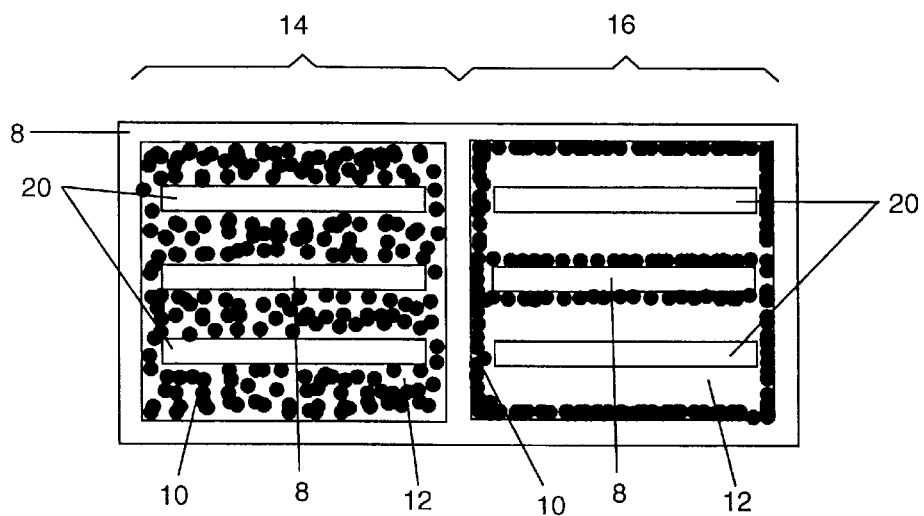
FIG. 5 is a top view of a fifth embodiment of electrophoretic display cells of the present invention.

Unlike the preceding embodiments that possess an approximate cylindrical symmetry, FIG. 5 illustrates a top view of an arrangement that utilizes three parallel plates to create an electric field whose strength is approximately constant across much of the cell. The collecting electrode 8 is comprised of the four perimeter walls and a center plate. The center plate passes through the center of the cell, is disposed parallel to two of the perimeter walls, and nearly spans one of the lateral dimensions of the cell. The center plate and perimeter walls are preferably held at the same voltage. The counter electrodes 20 in this embodiment are comprised of two addressable plates that are comparable in length to the center plate, are parallel to the center plate, and are disposed half-way between the center plate and two of the perimeter walls. The two counter electrodes are preferably held at the same voltage. This arrangement creates two "parallel-plate-like" electrode structures in each cell 14 and 16.

The structures with the vertical electrodes shown and described above can be built using a combination of well known lithographic and electroless or electrolytic plating techniques. For instance, a suitable substrate is coated with a colloidal palladium seed layer and then with a layer of photoresist. The photoresist is exposed and developed to make a pattern of trenches and holes where the walls and posts, respectively, will be located. The coated substrate is immersed in an electroless copper plating solution and copper is deposited in the trenches and holes defined by the photoresist. The photoresist is then removed with a suitable solvent, leaving the copper in the desired pattern of walls and posts. Alternatively, the same structure can be built by electrolytic deposition. A thin continuous conductive metal layer, preferably copper, 1000–2000 Angstroms thick, is deposited by vacuum deposition or electroless plating over the entire substrate. Photoresist is applied, exposed, and developed, to create a pattern of trenches and holes. The conductive layer is then contacted with an electrical lead, the substrate is immersed in an electrolytic plating bath and current applied to deposit copper or other metal electrolytically in the trenches and holes created in the photoresist. After these are deposited to a sufficient height, the photoresist is removed with a suitable solvent and the continuous metal remaining between the walls and posts removed with a suitable etchant, e.g., ferric chloride solution. Other metals besides copper can be used. For example, nickel, cobalt, silver and gold can be deposited by both electrolytic or electroless processes.

Other embodiments of this invention can use a different number of collecting and/or counter electrodes, and their positions and/or their shapes and/or their sizes can be different from that described. All the counter electrodes, for example, need not be vertically disposed. They could, for example, be comprised of a transparent conducting film deposited along the front and/or rear light-transmissive windows. In such an arrangement the distributed state need not be one in which the particles are distributed throughout the volume of the cell, the particles could be forced to form a layer across one or more horizontal surfaces of the cell. In addition, the perimeter wall for each cell need not be used as a collecting electrode nor even need be present. If a perimeter wall is used, however, it need not be impervious to particles and/or fluid from an adjacent cell.

In the embodiments described by the figures, the collecting electrode was the vertically-disposed electrode with the greatest vertical surface area. If the counter electrodes are also vertically disposed, however, the roles of the counter and collecting electrodes can be reversed or can even become indistinguishable. If, for example, the suspension is comprised of particles with both positive and negative polarities, then all the electrodes can function as both collecting and counter electrodes.

Although this invention has been described with respect to specific embodiments, the details thereof are not to be construed as limitations for it will be apparent that various embodiments, changes, and modifications may be resorted to without departing from the spirit and scope thereof. Further, it is understood that such equivalent embodiments are intended to be included within the scope of this invention.

What is claimed is:

1. An electrophoretic display comprising:
    a generally planar light-transmissive rear window;
    a generally planar light-transmissive front window;
    a plurality of cells located between the rear and front windows, each cell having a front wall generally parallel to the planar front window, a rear wall generally parallel to the planar rear window, four side walls generally perpendicularly to the rear and front windows and having generally rounded interior corners, and a center post located generally at the center of and extending generally perpendicularly to the planar rear and front windows, and each cell containing charged light-absorbing pigment particles in a light-transmissive fluid;
    a collecting electrode within each cell and comprising the four side walls within each cell, the collecting electrode being substantially non-obstructive to light for removing pigment particles in the cells from the path of light when the rear window is illuminated from behind so that light can reach the front window without significant attenuation;
    a counter electrode substantially non-obstructive to light and cooperative with the collecting electrode for distributing the pigment particles in the cells to substantially block the path of light when the rear window is illuminated from behind so that the light is significantly attenuated before reaching the front window; and
    a backlight located behind the rear window for passing light through the rear window and the cells to the front window for observation by a viewer of the display.

2. The display according to claim 1 wherein the center post has a generally rectangular cross section.

3. The display according to claim 1 wherein the counter electrode includes the center post.

4. The display according to claim 1 wherein the collecting electrode includes the center post.

5. The display according to claim 4 wherein each cell has a plurality of side posts extending generally perpendicularly to the planar rear and front windows and located between the center post and the side walls, and wherein the counter electrode includes the side posts.

6. An electrophoretic display comprising:
    a generally planar light-transmissive rear window;
    a generally planar light-transmissive front window;
    a plurality of cells located between the rear and front windows, each cell having a front wall generally parallel to the planar front window, a rear wall generally parallel to the planar rear window, four side walls generally perpendicularly to the rear and front windows and having generally rounded interior corners, and a center post located generally at the center of and extending generally perpendicularly to the planar rear and front windows, and each cell containing charged light-absorbing pigment particles in a light-transmissive fluid; and
    a backlight located behind the rear window for passing light through the rear window and the cells to the front window for observation by a viewer of the display;
    and wherein the four side walls of each cell form a collecting electrode substantially non-obstructive to light for removing pigment particles in the cells from the path of light when the rear window is illuminated from behind so that light can reach the front window without significant attenuation, and wherein the center post of each cell forms a counter electrode substantially non-obstructive to light and cooperative with the collecting electrode for distributing the pigment particles in the cells to substantially block the path of light when the rear window is illuminated from behind so that the light is significantly attenuated before reaching the front window.

7. The display according to claim 6 wherein the center post has a generally rectangular cross section.

8. An electrophoretic display comprising:
    a generally planar light-transmissive rear window;
    a generally planar light-transmissive front window;
    a plurality of cells located between the rear and front windows, each cell having a front wall generally parallel to the planar front window, a rear wall generally parallel to the planar rear window, four side walls generally perpendicularly to the rear and front windows, and three spaced-apart parallel plates oriented generally perpendicularly to the planar rear and front windows, and each cell containing charged light-absorbing pigment particles in a light-transmissive fluid;
    a collecting electrode within each cell and comprising the four side walls and the center one of said three plates within said each cell, the collecting electrode being substantially non-obstructive to light for removing pigment particles in the cells from the path of light when the rear window is illuminated from behind so that light can reach the front window without significant attenuation;
    a counter electrode within each cell and comprising the other two of said three plates within said each cell, the counter electrode being substantially non-obstructive to light and cooperative with the collecting electrode for distributing the pigment particles in the cells to substantially block the path of light when the rear window is illuminated from behind so that the light is significantly attenuated before reaching the front window; and
    a backlight located behind the rear window for passing light through the rear window and the cells to the front window for observation by a viewer of the display.

* * * * *